July 14, 1970     D. A. DAVIS ET AL     3,520,208

TRANSMISSION CONTROL

Filed Nov. 1, 1968     2 Sheets-Sheet 1

INVENTORS
Dennis A. Davis,
Charles E. Kinkade, &
Harold L. Sharp

Charles R. White
ATTORNEY

July 14, 1970  D. A. DAVIS ET AL  3,520,208
TRANSMISSION CONTROL

Filed Nov. 1, 1968  2 Sheets-Sheet 2

INVENTORS
Dennis A. Davis,
Charles E. Kinkade, &
Harold L. Sharp

Charles R. White
ATTORNEY

United States Patent Office 3,520,208
Patented July 14, 1970

3,520,208
TRANSMISSION CONTROL
Dennis A. Davis, Rochester, Charles E. Kinkade, Warren, and Harold L. Sharp, Farmington, Mich., assignors to General Motors Corporation, Detroit, Mich., a corporation of Delaware
Filed Nov. 1, 1968, Ser. No. 772,573
Int. Cl. G05g 7/00
U.S. Cl. 74—473      6 Claims

ABSTRACT OF THE DISCLOSURE

A control for an automatic transmission in which stop shoulders on a fixed plate are engageable by a selector lever mounted pawl to locate park, reverse, neutral, automatic forward drive and low. The pawl can be moved to a position in which it engages positive stops on a moveable indexing plate yieldably supported in a central position. The indexing plate operates to positively limit movement of the selector lever to different positions so that the transmission can be manually up shifted and down shifted through all forward drive speed ratios including a second speed ratio.

---

This invention relates to transmission controls and more particularly to an automatic transmission control incorporating an indexing mechanism for the selector, which permits the transmission to be manually shifted with all forward drive speed ratios positively selected in a stepped pattern.

In this invention the selector, mounted for movement in a single path, has a pawl which automatically engages shoulders on a fixed stop plate so that the selector cannot be inadvertently moved to predetermined positions, thereby insuring that the automatic transmission is not inadvertently conditioned for predetermined operations. By clearing the pawl from the stop shoulders, the transmission can be conditioned by movement of the selector for any selected operation. There is also an indexing plate which is held by yieldable means in a predetermined location, and selectively engageable by the pawl for the manual step on shifting of the transmission. When it is desired to manually up shift and down shift the transmission, the selector movement is limited by the indexing plate to insure that the transmission up shifts and down shifts are accomplished in a stepped manner. There is sufficient clearance between the indexing plate and the stop plate to allow the pawl to pass between these two plates to allow the transmission to be controlled without engaging the indexing plate.

A feature and object of this invention is to provide a control for an automatic transmission having a pivoted indexing plate having at least three different engagement surfaces sequentially engageable by a pawl mechanism on the selector to permit the positive sequenced shifting of the transmission between low, intermediate and high speed drive ratios.

Another feature and object of this invention is to provide a transmission control having a selector mounted for pivoted movement in one path to condition an automatic transmission for selected operation; the selector is engageable with an indexing mechanism to permit the lever to be moved to predetermined locations in the same path to permit the manual up shifting and down shifting of the transmission with all forward speed ratios positively selected.

Figure 1:
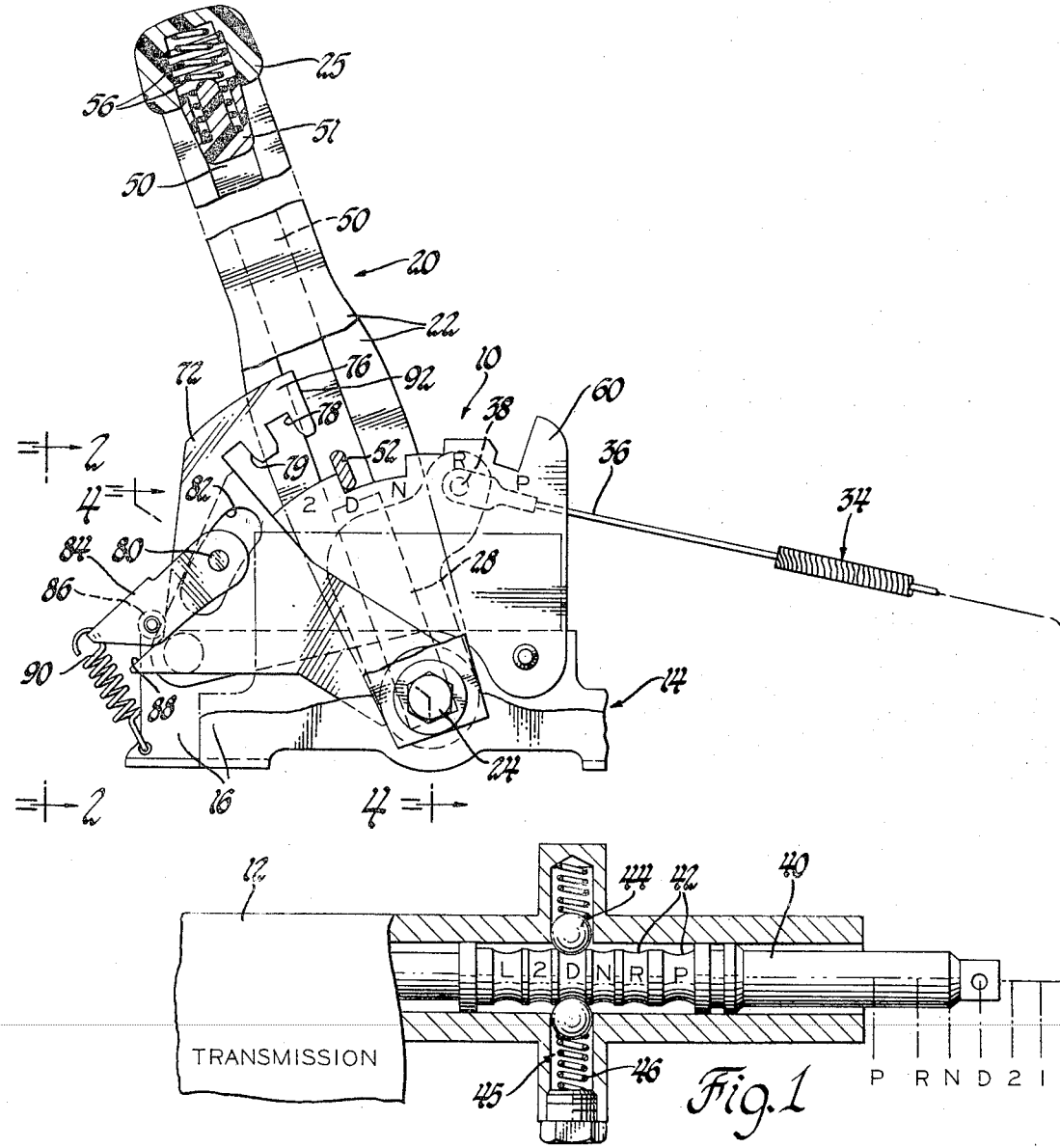

These and other features and objects of this invention will become more apparent from the following detailed description and drawings in which:

FIG. 1 is a side elevation view of a transmission shift control operating shifter valve in an automatic transmission.

Figure 2:
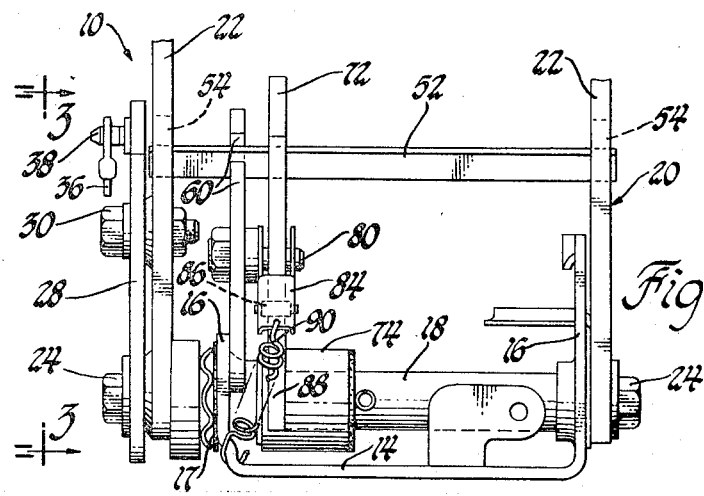
Figure 3:
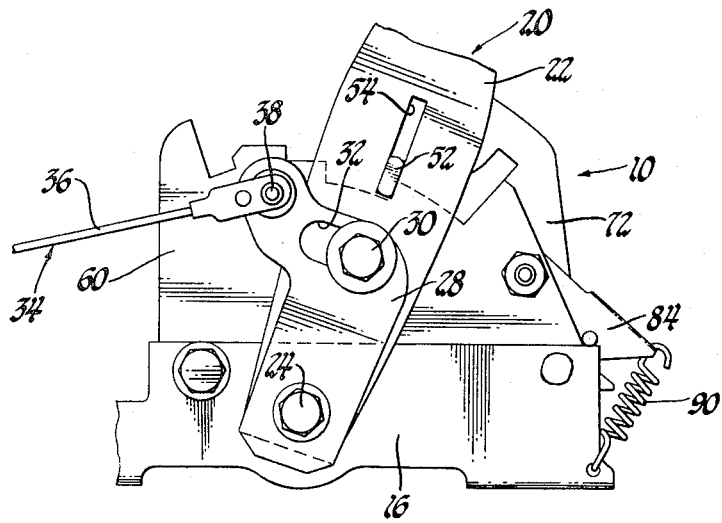
Figure 4:
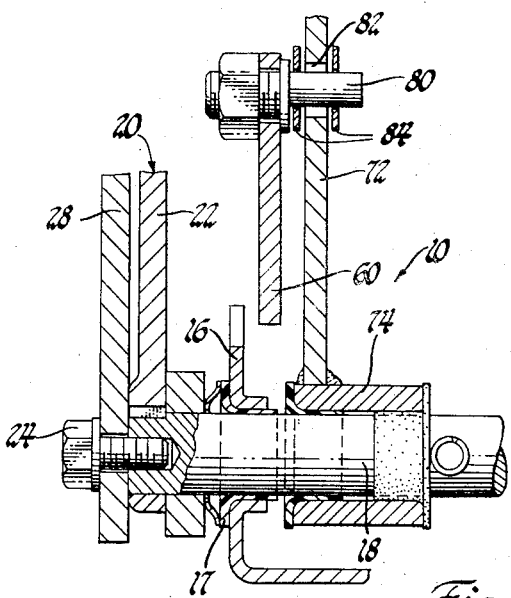
Figure 5:
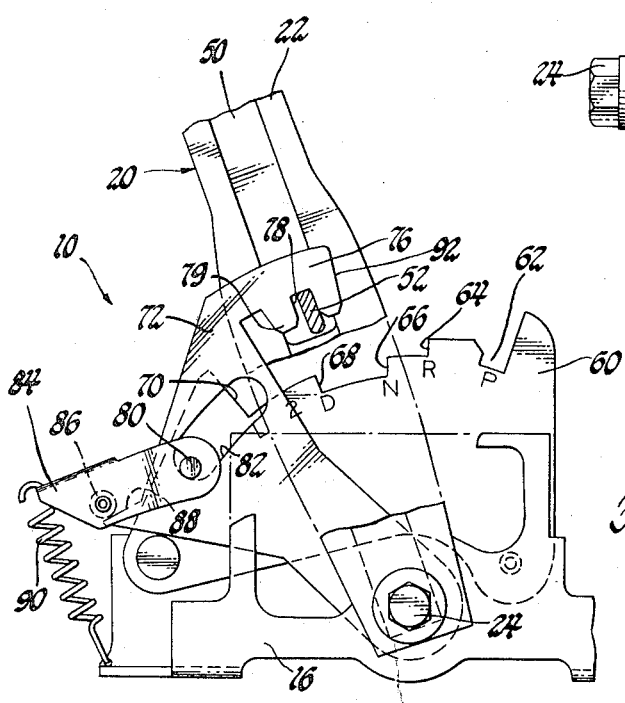

FIG. 2 is a view taken along the lines 2—2 of FIG. 1.
FIG. 3 is a view taken along the lines 3—3 of FIG. 2.
FIG. 4 is a view taken along the lines 4—4 of FIG. 1.
FIG. 5 is a view taken on the opposite side from the view shown in FIG. 1.

In FIG. 1 there is shown a transmission shift control assembly 10 for operating an automatic transmission 12. The transmission is a conventional automatic transmission preferably having low; second; high-speed forward drives, a reverse drive, neutral and park. Assembly 10 has a support bracket 14 with upstanding and spaced side walls 16 supporting anti-friction bearings 17, through which selector or pivot shaft 18 extends. This shaft supports stirrup-like selector or lever assembly 20 with spaced legs 22 rigidly fastened by keys or other suitable means to the pivot shaft outboard of the side walls. Suitable retainers such as bolts 24 are threaded into the opposing ends of the pivot shaft and carry washers or other suitable constructions to keep the lever assembly secured to the pivot shaft. As shown in FIG. 4, a spring washer and a spacer are mounted on shaft 18 between side wall 16 and leg 22. The lever assembly has a longitudinally extending grip or handle 25 connecting the upper ends of the legs. The lever assembly is operatively connected to the transmission by conventional construction so that movement of the lever sets the transmission for a selected operation.

As shown best by FIGS. 1, 3 and 4, a lever 28 is secured to the pivot shaft 18 by the bolt 24 and to one of the legs 22 by a bolt 30. Slot 32, through which bolt 30 extends, provides an adjustment between the lever 28 and the leg 22 so that the position of the lever may be adjusted in relation to the leg. A transmission control cable assembly 34 is employed to operatively connect the lever 28 to the transmission. This assembly includes a push-pull cable 36 which is connected at one end by pin 38 to the free end of lever 28 and which is operatively connected at the other end to an axially shiftable selector valve 40. This valve is conventional and forms part of conventional hydraulic controls in the transmission. The selector valve has spaced annular grooves 42 which accommodate the balls 44 of ball detents 45 in the transmission. The balls are pressed into engagement with the grooves 42 by coil springs 46 so that the valve will be detented and thereby retained in any adjusted position.

The legs 22 and the handle 25 are internally recessed to accommodate a pawl assembly which is generally rectangular having parallel side bars 50 connected at their upper end by an actuator 51 and at their lower end by a pawl 52. The pawl assembly slidably fits within the lever assembly; the side bars slidably fit in inwardly-facing tracks or recesses in the legs and the opposing ends of the pawl project through respective slots 54 in the legs. Coil springs 56 between the handle 25 of the lever assembly and the upper portion of the actuator 51 provide a force urging the pawl assembly downwardly and the ends of the pawl 52 into engagement with the lower extremities of slots 54. By squeezing the handle and actuator with the hand, the pawl assembly can be moved upwardly as a unit against the force of spring 56 so that the pawl is moved toward the upper extremities of slots 54.

A fan shaped stop plate 60 is securely fixed to the left side wall 16. This top plate is notched to provide spaced positive stops for the pawl 52. These stops co-operate with the pawl to limit movement of the lever assembly to predetermined locations so that transmission operation cannot be changed from one predetermined operation to another without clearing a predetermined stop. For example, the transmission cannot be shifted from neutral to reverse without raising pawl 52 clear of the shoulder 66 in the stop plate. Notch 62 receives the pawl to positively locate the lever assembly in a position whereby the transmission is conditioned for park. Shoulders 64, 66, 68 and 70 provide stops which locate the lever assembly in reverse, neutral, forward automatic drive and low speed forward drive respectively.

When the lever assembly is moved rearwardly, the pawl 52 makes contact with the shoulders 68 and 70 to positively position the lever assembly at the automatic drive and low forward drive respectively. In manually down shifting from high speed forward drive, the shoulder 68 must be cleared by raising pawl 52 by manually gripping the handle 25 and raising actuator 51 with a force sufficient to overcome spring 56. The lever assembly can then be turned to the second forward speed position located by the ball detent 45 which engages the appropriate groove in valve 40. By over-riding the retarding force of this ball detent, the transmission can be up shifted and down shifted between first and third forward speeds.

In the event that full manual control over the transmission is desired with positive stops for all forward drive gear ratios, there is an indexing plate 72 which is pivotally mounted on the pivot shaft 18 by a collar 74.

The indexing plate has a radial leg which extends from the collar and has an arcuately extending portion 76 formed with inwardly-projecting teeth which are spaced to provide first and second notches or recesses 78 and 79 for receiving the pawl 52 when the actuator moves the pawl upwardly against the opposing force of the springs 56. There is a stop pin 80, which extends from the fixed stop plae into a slot 82 formed in the indexing plate as shown in FIGS. 1 and 3. Contact of the pin and the extremities of slot 82 limits the fore and aft movement of the indexing plate during operation of the control.

The pin 80 also acts as a pivot for a bifurcated spring-loaded arm 84, which has a roller 86 that rides on exterior cam or ramp 88 that is generally V-shaped. A spring 90, grounded to the base plate and secured to one end of the arm operates to yieldably maintain the indexing plate in a predetermined position with pin 80 centrally located in slot 82. In this position the roller is in the low or detent point of the ramp which is then on a radial line from the pivot axis of shaft 18 so that plate 72 experiences no turning moment.

When the actuator 51 is fully pressed, the pawl moves up to engage in one of the notches or the front edge 92 of the indexing plate. The notch or surface engaged depends on the position of the pawl.

In operating the transmission in a manual down-shift sequence and assuming that the transmission is operating in its high speed ratio, the lever assembly will be in its FIG. 1 position. For down shifting, the pawl 52 is moved upwardly so that it engages the front edge 92 of the indexing plate. The lever assembly and indexing plate can then be rotated rearwardly as a unit in the same path as employed for selecting automatic operations for a predetermined distance determined by the engagement of pin 80 and the upper end of slot 82. When the lever assembly is moved to this limited position, the cable 36 will be pulled to move the selector valve 40 for a distance equal to one groove thereby conditioning the transmission for second forward speed ratio. When this occurs, the forced manual down shift from third to second is completed.

As the indexing plate rotates, the roller 86 will ride up on the upper leg of the V-ramp against the pull of coil spring 90. When the actuator 51 is released, the pawl will be forced into engagement with the stop plate 60 by action of the springs 56. At this time the spring 90 acting through roller 86 on the cam surface of the indexing plate rotates the indexing plate to its initial centered position of FIG. 1 with notch 78 aligned with the pawl 52. The indexing plate is then ready for further indexing operation.

For down shift from second speed forward to low speed forward, the pawl 52 may be raised so that it engages first notch 78 in the indexing plate, the lever assembly and the indexing plate may be rotated rearwardly until this motion is again limited by the pin 80 and slot 82 as described previously. When this point is reached, the transmission will be conditioned for low range drive with the shifter valve 40 being moved from second to low speed forward position. As described above, the roller 86 again rides up on the cam surface 88 so that when the pawl is released, the indexing plate will return to the initial position with the roller at the joint of the V exerting a force directed toward the axis of the shaft 18. At this time, notch 79 will be aligned with pawl 52.

In a manner similar to that described, up shifts can be made with the pawl engaging the second notch 79 for selecting the second speed ratio. The indexing plate will be rotated with the lever assembly until limited by the pin 80 and the lower extremity of slot 82. The roller 86 will ride up on the lower inclined surface of the V ramp when the lever assembly is moved to the second forward speed position. When the pawl is released, the roller will act on this cam surface to return the indexing plate to its initial position. The pawl will then be aligned with the first notch 78 in the indexing plate and ready for a subsequent up shift to the third forward speed ratio. Thus when the pawl is raised, the first notch will be engaged so that the indexing plate can be moved with the lever assembly to the third forward speed position. It will be appreciated that the lever assembly travels the same path for both automatic and manual operation.

If forced positive stop up shifting and down shifting is not desired, the clearance between the stop plate 60 and the indexing plate allows the pawl to pass freely therebetween, to permit the complete functional operation of the control without engaging the indexing plate.

Although a particular embodiment of the invention has been shown and described, there are modifications, which are obvious to those skilled in the art. The limitations of the invention are set forth in the following claims.

We claim:

1. A control for a change-speed transmission comprising a support, selector means mounted for movement with respect to said support to a plurality of predetermined positions along a predetermined path for changing transmission input/output speed ratio, positive stop means operatively connecting said selector means and said support for serially positioning said selector means at first and second positions as said selector means is moved in said path, indexing means selectively engageable by and moveable with said selector means as said selector means is moved in said path for positioning said selector means in said first position and at least a third position, and yieldable means operatively connected to said support and said indexing means for positioning said indexing means in a predetermined location when released from engagement with said selector means.

2. A transmission control for an automatic change speed transmission comprising a support, a selector, pivot means pivotally mounting said selector for turning movement in a predetermined path with respect to said support, detent means operatively connecting said selector and said support for limiting movement of said selector in said path to different predetermined stations, each of said stations corresponding to a different mode of transmission operation, and indexing means selectively operatively engageable by said selector and moveable therewith for a predetermined distance to limit movement of said selector in said path to said predetermined stations and to at least another predetermined station, which corresponds to another mode of transmission operation.

3. A control for a multi-speed ratio transmission comprising a support, selector means moveably mounted on said support for conditioning said transmission for first, second and third modes of operation, pivot means for pivotally mounting said selector means on said support for movement in a plane, a stop plate, means for securing said stop plate with respect to said support, said stop plate having spaced stop shoulders thereon which correspond to predetermined transmission input/output speed ratios, an indexing plate mounted for pivotal movement with respect to said support, positioning means for yieldably positioning said indexing plate in a predetermined location, pawl means on said selector for selectively engaging said indexing plate and for releasably connecting said indexing plate to said selector means, stop means for limiting the movement of said indexing plate and thereby the movement of said selector means in said plane to a predetermined position disposed between said spaced stop shoulders to condition said transmission for a third mode of operation.

4. In a transmission control for an automatic transmission having gearing providing at least low, intermediate and high input/output forward-drive speed ratios, a base, a selector lever pivoted to said base for selecting transmission modes of operation, a stop plate for said lever having a first stop position corresponding to automatic forward drive between said low and intermediate and high speed ratios and having a second stop position corresponding to said low speed ratio, pawl means mounted on said selector lever for engaging said first and second stop positions to thereby position said lever at predetermined locations to effect the conditioning of said transmission for predetermined speed ratios, yielding means carried by said lever for urging said pawl means into engagement with said stop plate, an indexing plate having a plurality of spaced contact surfaces thereon, pivot means for pivotally mounting said indexing plate with respect to said base, means for limiting the pivotal movement of said indexing plate, yieldable means for positioning said indexing plate to a position whereby a first of said surfaces is aligned with said first stop position and another of said surfaces is aligned with said second stop position, actuator means to move said pawl means from said first stop position into engagement with said first of said surfaces to thereby permit said lever to move said indexing plate until said indexing palte stops movement of said lever at a predetermined position between said first and second stop position to thereby condition the transmission for intermediate speed ratio.

5. The transmission control of claim 4, said stop means for limiting movement of said indexing plate comprising a pin fixed ot said stop plate and an elongated slot in said indexing plate into which said pin extends, said pin being located in said slot when said indexing plate is in said predetermined position spaced from the ends of said slot, said means for positioning said indexing plate in said predetermined position comprising a cam surface on said indexing plate, a lever pivotally mounted with respect to said support and having contact means for engaging said cam surface, and spring means operatively connected to said lever for exerting a force on said cam surface through said contact means when said indexing plate is moved from said predetermined position to urge said indexing plate to said predetermined position.

6. In a control for an automatic transmission having gearing providing a plurality of different transmission input/output speed ratios, a support, a selector mounted for pivotal movement with respect to said support for selecting different transmission operating ranges, stop means operatively connected to said support for positively stopping said selector at different positions as it is pivoted to accordingly set said transmission for different automatic operations, indexing means mounted for limited movement from a predetermined position by said selector to provide a manual up shift and down-shift shift sequence, biasing means for positioning said indexing means at said predetermined position, and said indexing means having a first set of spaced contact surfaces each selectively connectable with said selector for establishing said manual down shift sequence and having a second set of spaced contact surfaces each selectively engageable with said selector for establishing said manual up shift sequence.

References Cited
UNITED STATES PATENTS 3,292,450 12/1966 Hurst et al. _____ 74—473
3,465,612 9/1969 Letwin et al. _____ 74—473

MILTON KAUFMAN, Primary Examiner